United States Patent [19]

Thuries

[11] Patent Number: 5,089,665
[45] Date of Patent: Feb. 18, 1992

[54] METAL-CLAD ELECTRICITY LINE AND METHOD OF MANUFACTURING IT

[75] Inventor: Edmond Thuries, Meyzieu, France

[73] Assignee: GEC Alsthom SA, Paris, France

[21] Appl. No.: 597,128

[22] Filed: Oct. 15, 1990

[30] Foreign Application Priority Data

Oct. 16, 1989 [FR] France .................. 89 13488

[51] Int. Cl.⁵ ............................................. H01B 9/06
[52] U.S. Cl. .................... 174/27; 174/14 R;
174/21 C; 174/22 C; 174/28
[58] Field of Search ............... 174/14 R, 16.2, 21 C,
174/22 C, 27, 28, 99 B

[56] References Cited

FOREIGN PATENT DOCUMENTS 3315588 10/1984 Fed. Rep. of Germany .
376555 5/1964 Switzerland .
550502 4/1974 Switzerland .

OTHER PUBLICATIONS

IEEE Transactions on Power Apparatus & Systems, vol. 90, No. 6, Nov. 1971, pp. 2631-2637; B. O. Pedersen et al.: "Development of a Compressed-Gas-Insulated Transmission Line".

*Primary Examiner*—Morris H. Nimmo
*Attorney, Agent, or Firm*—Sughrue, Mion, Zinn, Macpeak & Seas

[57] ABSTRACT

For each phase, a metal-clad line comprises a phase conductor surrounded by an aluminum sheath, with each aluminum sheath being surrounded by a sheath which is gas-tight relative to the outside. The inside of said gas-tight sheath(s) is/are filled with a gas having good dielectric properties. The aluminum sheath is made up of two half-shells with each half-shell being formed by a folded strip whose section is in the form of a semicircle terminated at each end by a shoulder and a flat, with the two half-shells being juxtaposed and assembled to each other via their flats. The invention also provides a method of manufacturing the metal-clad line which is particularly applicable to underground metal-clad lines.

35 Claims, 8 Drawing Sheets

5,089,665

METAL-CLAD ELECTRICITY LINE AND METHOD OF MANUFACTURING IT

The present invention relates to a metal-clad electricity line of the type in which the conductor is placed inside a metal enclosure which is filled with a gas having good dielectric properties, e.g. sulfur hexafluoride.

BACKGROUND OF THE INVENTION

In French patent application No. 89 01 029, filed Jan. 27, 1989, the Applicant describes a three-phase metal-clad line, comprising three phase conductors each surrounded by an aluminum sheath filled with a gas having good dielectric properties, with the various sheaths being surrounded by a steel sheath which is gas-tight against the outside. According to a characteristic of the invention described in the above-specified document, the line is built up from lengths that are interconnected by link elements enabling the line to be assembled and also enabling a faulty length to be disassembled.

An object of the present invention is to define more precisely the various component parts of a line similar to that described previously, and to describe a method of assembling and disassembling the line.

SUMMARY OF THE INVENTION

The present invention provides a method of manufacturing a metal-clad line comprising, for each phase, a phase conductor surrounded by an aluminum sheath, with the aluminum sheaths being surrounded by at least one sheath which is gas-tight relative to the outside, the gas-tight sheath and the aluminum sheaths being filled with a gas having good dielectric properties and under pressure, the method being characterized in that it comprises the following operations:

gas-tight tubes of length lying in the range 5 meters to 20 meters are used for making lengths of gas-tight sheath of length L;

two thin strips of aluminum are used to make two half-shells which are assembled together progressively as they are being made, thereby constituting the aluminum sheath, which strips are provided with stiffening members, holding members for holding the phase conductor, and running means;

the phase conductor is disposed inside the aluminum sheath progressively while it is being built up, with the phase conductor being fixed to the above-mentioned holding members;

as the assembly (or the assemblies) constituted by the aluminum sheath and its conductor are built up, it (they) is (are) are pulled progressively into the length of gas-tight sheath until the opposite end of the length of gas-tight sheath is reached;

1 to 4 of the above-mentioned assemblies are disposed inside each gas-tight sheath;

the above operations are repeated to make another length of metal-clad line following the length that has just been built up;

the gas-tight sheath (or gas-tight sheaths), the aluminum sheaths and the conductors in the two following lengths are interconnected by link means between the lengths;

all of the above operations are repeated until each of the phases of the line has the desired length; and the line is filled with the selected dielectric gas at the desired pressure, length by length.

The invention also provides a metal-clad line comprising, for each phase, a phase conductor surrounded by an aluminum sheath, each aluminum sheath (or each group of aluminum sheaths) being surrounded by a sheath which is gas-tight relative to the outside, the insides of said gas-tight sheaths being filled with a gas having good dielectric properties, the line being characterized in that the aluminum sheath is made up from two half-shells, each half-shell being formed from a folded strip whose section is in the form of a semicircle terminated at each end by a shoulder and by a flat, the half-shells being juxtaposed and assembled by means of the flats.

BRIEF DESCRIPTION OF THE DRAWINGS

Embodiment of the invention are described by way of example with reference to the accompanying drawings, in which.

DETAILED DESCRIPTION

The metal-clad line of the invention is used mainly when natural obstacles (e.g. a river) or ecological considerations make it necessary to place a line in an underground gallery or to bury it in the ground.

Figure 1:
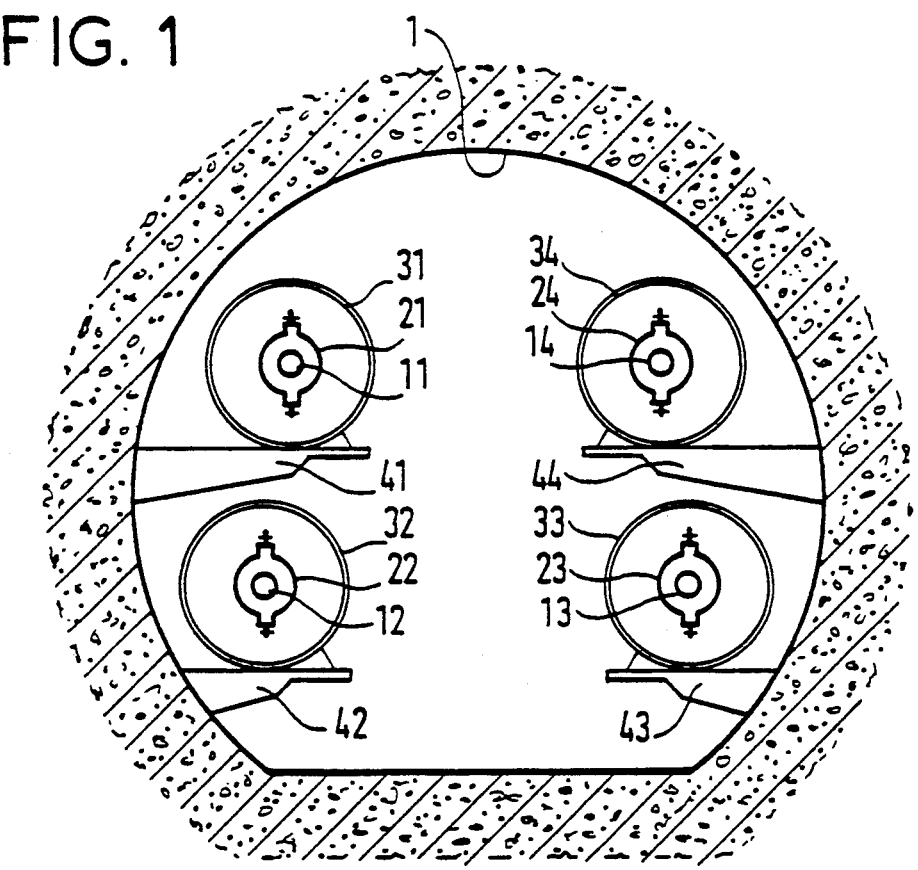
FIG. 1 is a cross-section view through a metal-clad line having four phase conductors each surrounded by an aluminum sheath, these sheaths being surrounded by respective sheaths that are gas-tight relative to the outside.

FIG. 1 is a cross-section showing an underground gallery 1 in which four conductors 11, 12, 13, and 14 are disposed, one for each phase of a three-phase line, plus a spare line. Each conductor is surrounded by a respective aluminum sheath 21 to 24. The aluminum sheaths are themselves surrounded by respective sheaths which are gas-tight relative to the outside. These gas-tight sheaths referenced 31 to 34 are placed on appropriate supports 41 to 44 and they are preferably made of steel, even though it would be possible to make them from some other substance. Since these sheaths do not have any electrical function, the material from which they are made could be concrete, plastic, or more generally any material capable of being gas-tight relative to the outside when filled with a gas under pressure. In addition, this substance must be suitable for making up lengths capable of being assembled to one another easily. These sheaths are referred to below as "gas-tight sheaths" and the tubes from which they are made up are referred to as "gas-tight tubes".

The sheaths 21 to 24 are filled with a gas having good dielectric properties, e.g. sulfur hexafluoride $SF_6$, either pure or mixed with another gas, and at a pressure of a few bars. The aluminum sheaths are not gas-tight, they are merely dust-proof.

As already mentioned, the line is made up of lengths that are interconnected end to end. The length L of each length is not critical, but depends on a compromise between handling requirements that favor having short lengths (a length which is a few tens of meters long is easier to handle than a length which is several hundreds of meters long), and economic requirements which tend towards long lengths since the most expensive items in a metal-clad line are its connection pieces and the interconnection operations. It seems that the ideal length lies somewhere between 50 meters and 150 meters.

The method of constructing the line is as follows:

lengths of gas-tight sheath are made from gas-tight tubes that are between 5 meters and 20 meters long;

two half-shells are made from two thin strips of aluminum and they are assembled together progressively as they are being made to constitute the aluminum sheath, the half-shells being provided with stiffening members, holding members for holding a phase conductor, and running means; and the phase conductor is disposed inside the aluminum sheath progressively while it is being built up, with the phase conductor being fixed to the above-mentioned holding members.

Three assemblies each constituting a phase conductor and its aluminum sheath are disposed in a common gas-tight sheath; or in a variant a single assembly of the above-mentioned type is placed in a respective gas-tight sheath and a three-phase line is made up from three gas-tight sheaths filled in this way (optionally together with an additional gas-tight sheath also provided with such an assembly for the purpose of constituting a spare conductor).

The method continues as follows:

as it is built up, the assembly (or the assemblies) constituted by the aluminum sheath and its conductor is (are) pulled into the length of gas-tight sheath until said assembly projects from the end of the length of gas-tight sheath;

the above-mentioned operations are repeated to build up another length of metal-clad line following the one that has just been made; and the gas-tight sheath (or the gas-tight sheaths), the aluminum sheaths, and the conductors of each of the two following lengths are fixed together by means of an interlength link member.

The operations described above are repeated until the line has the desired length, and this is done for each of the phases of the line.

The line is then filled with the selected dielectric gas at the desired pressure, length by length, and if necessary, phase by phase.

Each line length is provided with a gas filling orifice, a monitoring pressure gauge, and a molecular sieve.

It may be observed that when made of steel, the gas-tight sheaths have no protective inside lining, while their outside surfaces are covered with a layer of paint or tar to prevent corrosion.

Figure 2:
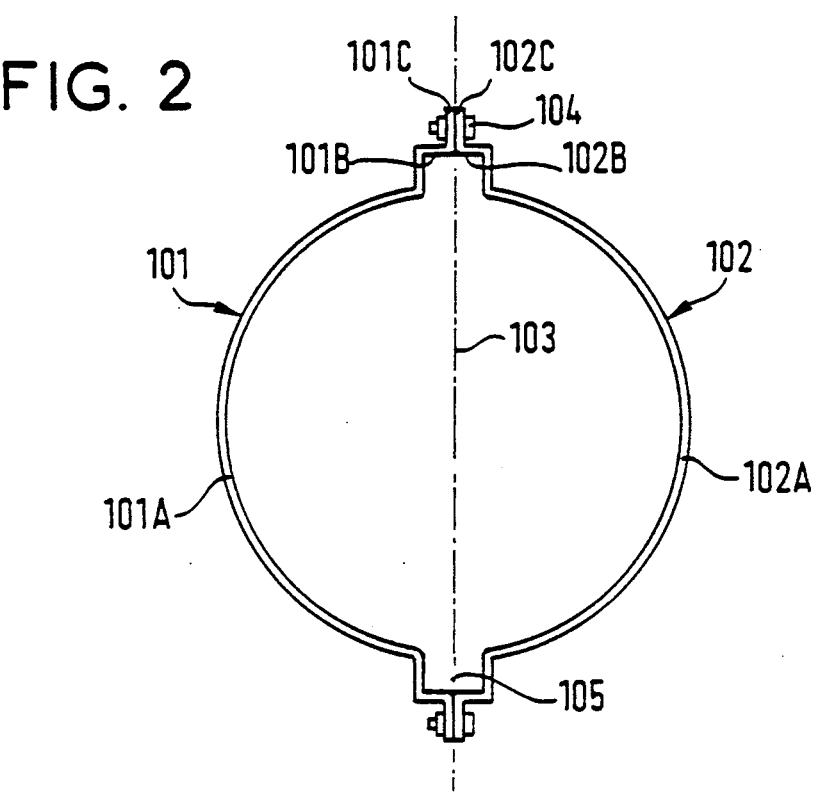
FIG. 2 is a cross-section view through an aluminum sheath for surrounding a phase conductor.

FIG. 2 is a cross-section through the aluminum sheath which is made up of two strips 101 and 102 that are shaped and assembled to each other in a plane 103. In section, each strip includes a circular portion 101A (102A), a shoulder 101B (102B), and a flat 101C (102C) pierced by holes for receiving fasteners such as rivets or nut-and-bolt assemblies 104. It is also possible to envisage welding the two strips to each other. It may be observed that the way in which the two strips are assembled to each other may be simple since the aluminum sheath is not required to be gas-tight, and merely provides protection against outside dust.

Inside the gas-tight sheath, the aluminum sheath is disposed in such a manner that its plane 103 is vertical so that any dust that may be contained therein falls into the groove 105 delimited between the two bottom shoulders, thereby preventing the dust from spoiling the dielectric performance of the assembly.

The example described below relates to a metal-clad line where each aluminum sheath is disposed inside its own gas-tight sheath.

Figure 3:
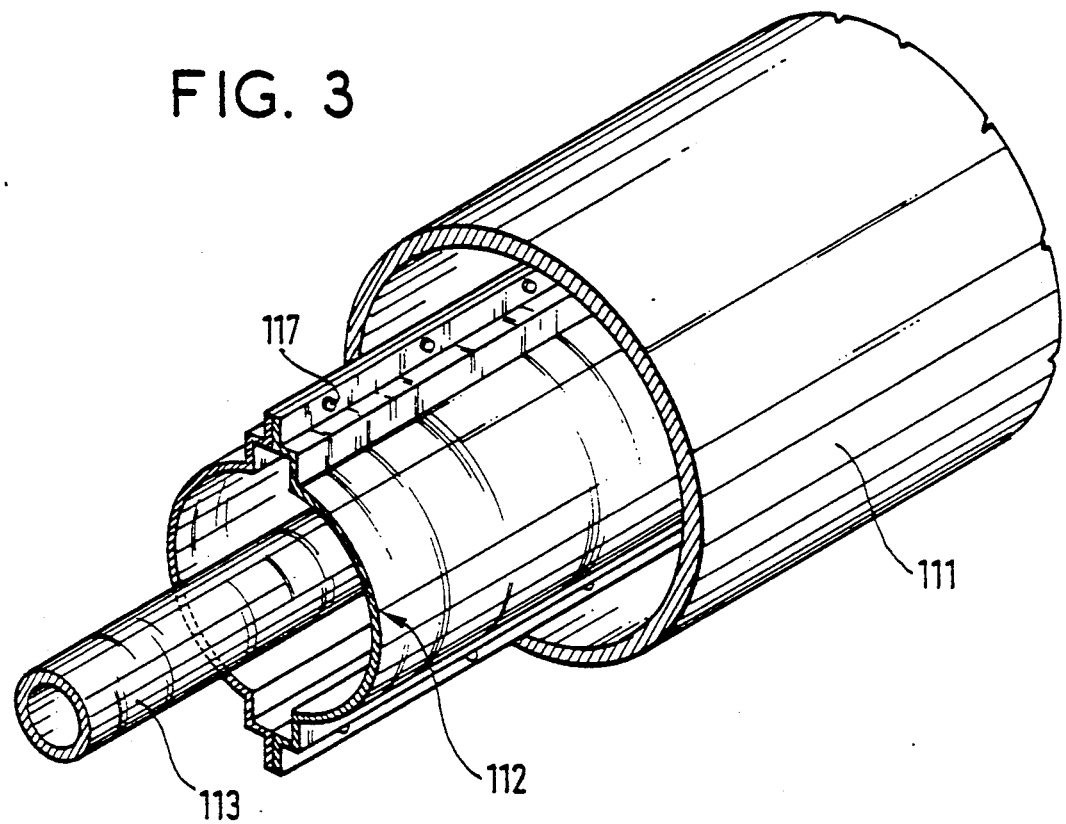
FIG. 3 is a perspective view of a part of a length of one phase of the line.

FIG. 3 is a perspective view of a part of a length of one phase of the metal-clad line comprising a gas-tight outer sheath 111, a dust-proof aluminum sheath 112 made and disposed as described above, and a phase conductor 113 constituted by a bar. The inside of the length is filled with a dielectric gas under pressure. Reference 117 designates the fasteners holding together the two half-shells of the aluminum sheath.

Figure 4:
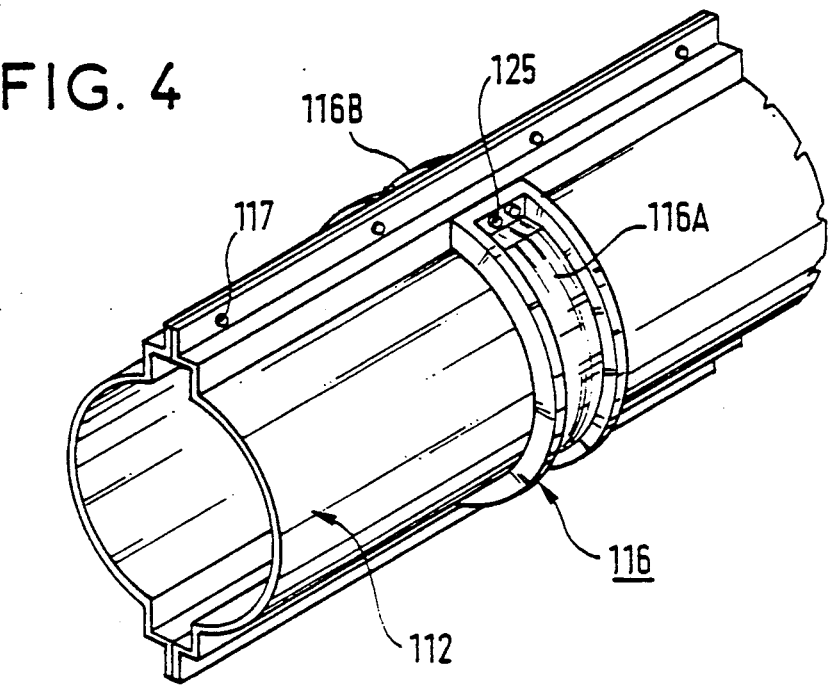
FIG. 4 is a fragmentary perspective view of an aluminum sheath provided with a stiffener.

FIG. 4 shows part of an aluminum sheath 112. In order to ensure that the thin aluminum sheaths have adequate mechanical strength (they are a few millimeters thick), they are provided at intervals with stiffeners 116 constituted by pairs of half-collars 116A and 116B which are preferably made of cast iron. The collars are clamped onto the sheath by means of screws 125 made of non-magnetic material. The half-collars are clamped together over the grooves, and to prevent crushing the aluminum sheaths, and spacers or props may be disposed inside the grooves (not shown).

Figure 5:
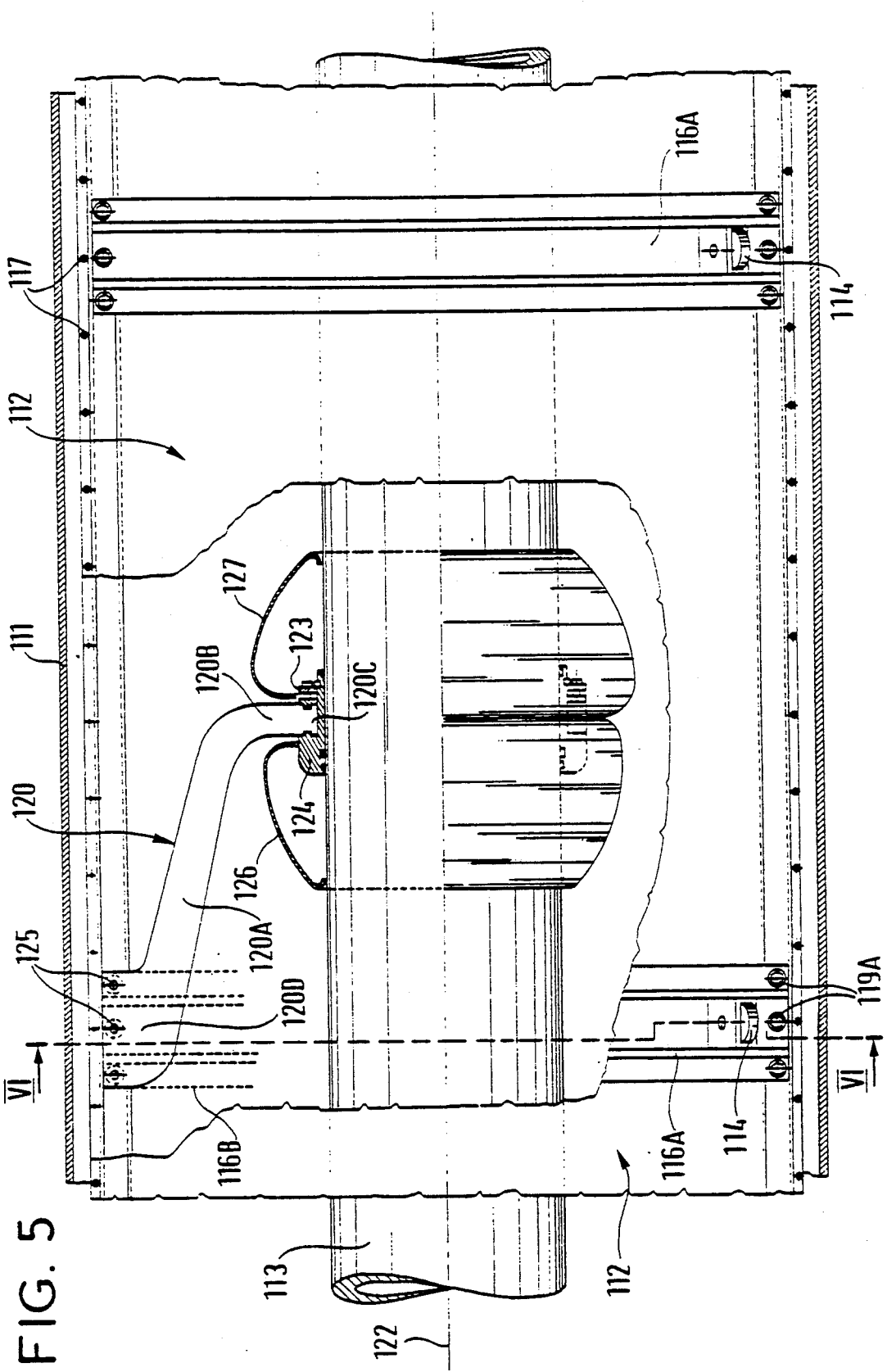
FIG. 5 is a partially cut-away elevation view showing a portion of a phase conductor provided with its aluminum sheath in accordance with the invention.
Figure 6:
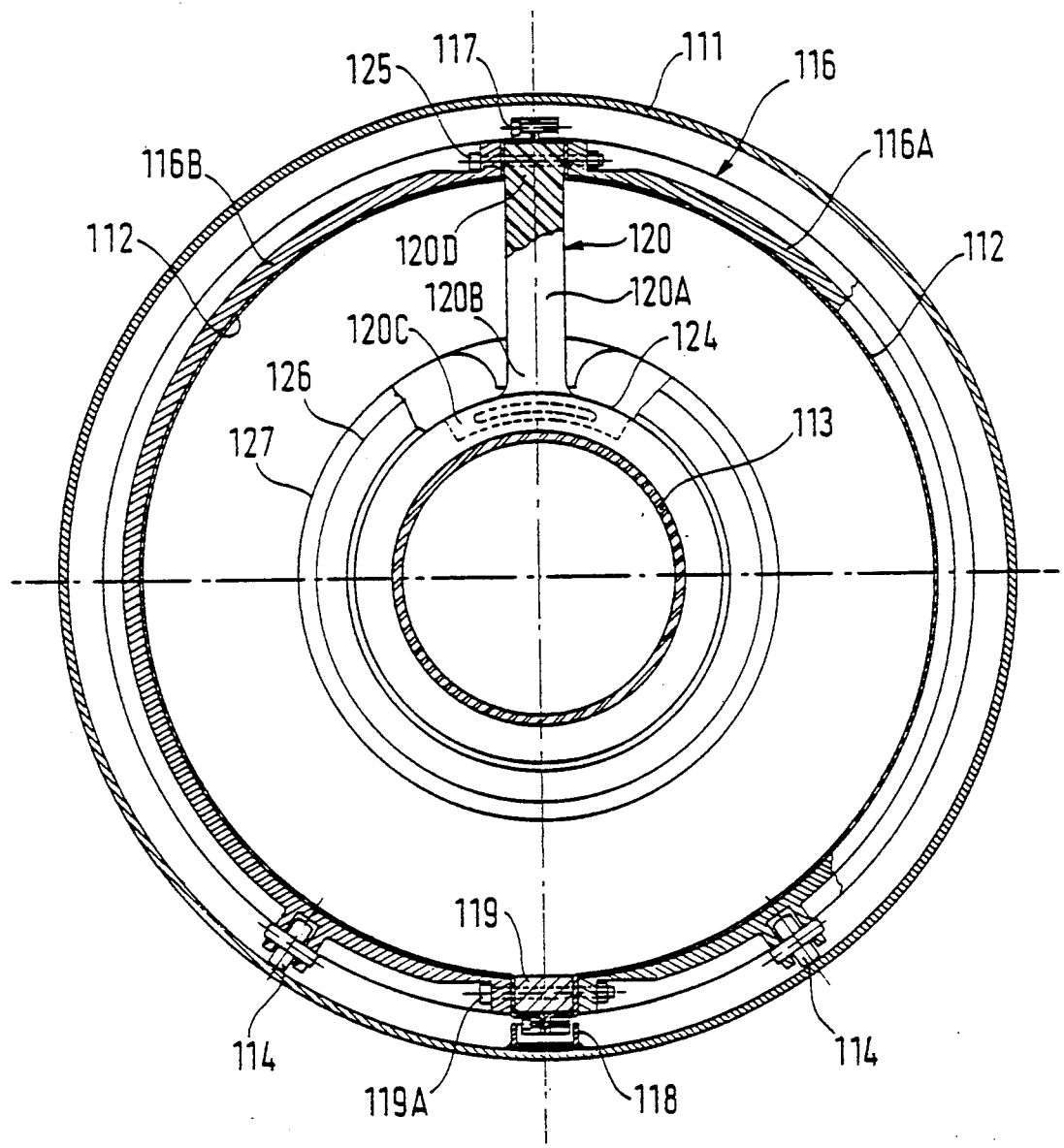
FIG. 6 is a section view on line VI—VI of FIG. 5.

FIGS. 5 and 6 show in greater detail how the various component parts of a phase conductor are disposed and held relative to one another. The aluminum sheath 112 stands on the bottom of the sheath 111 via wheels 114. These wheels thus also serve to facilitate displacing the aluminum sheath inside the gas-tight sheath during line construction, as described above. An abutment 118 is welded in the bottom of the gas-tight sheath and serves to guide the aluminum sheath as it moves and to ensure that it is properly orientated.

The width of the groove 105 is kept constant by means of spacers 119 clamped by bolts 119A.

The conductor 113 is held inside the aluminum sheath 112 and on the axis thereof by an insulating device given an overall reference 120 and comprising a portion of a cone 120A extending from the wall of the sheath to the periphery of the conductor to be supported.

The cone portion 120A is extended at its conductor end by an arm 120B which is perpendicular to the common axis 122 of the sheath and the conductor, and which includes a spreader 120C provided with a slot for receiving a fixing screw 123 of a clamping collar 124.

The other end of the conical portion 120A is extended by a leg 120D which engages in the top groove of the aluminum sheath 112 and which is fixed thereto by bolts 125.

The insulating support 120 is preferably made by molding a material of the type conventionally used for making insulating cones in metal-clad type electrical installations.

The support used in the present invention provides the same operating security at cheaper cost.

The insulating support is preferably fixed in the top groove of the aluminum sheath so that any dust tends to fall into the bottom groove.

The support 120 is associated in conventional manner with two corona protectors 126 and 127 disposed on either side of the arm 120B.

Figure 7:
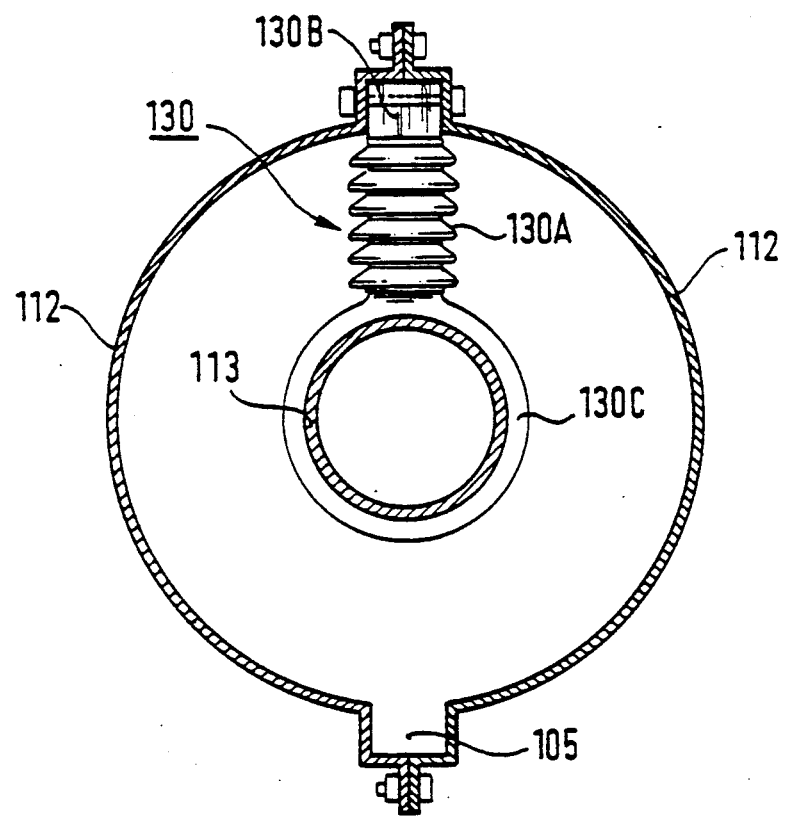
FIG. 7 is a cross-section view of a conductor held inside its aluminum sheath by means of a variant fixing element.

FIG. 7 is a cross-section view through an aluminum sheath 112 having a phase conductor 113 supported by a different embodiment of the fixing elements. The fixing element 130 holding the conductor is a circularly symmetrical insulator, optionally including fins 130A, with a fixing leg 130B engaging the aluminum sheath and a clamping collar 130C imprisoning the conductor 113.

In the FIG. 7 embodiment, the support 130 is suspended from the top portion of the sheath so that any dust tends to fall into the bottom groove 105 of the sheath. This disposition is preferred, but naturally the support 130 could alternatively be fixed in the bottom groove 105 of the aluminum sheath.

Figure 8:
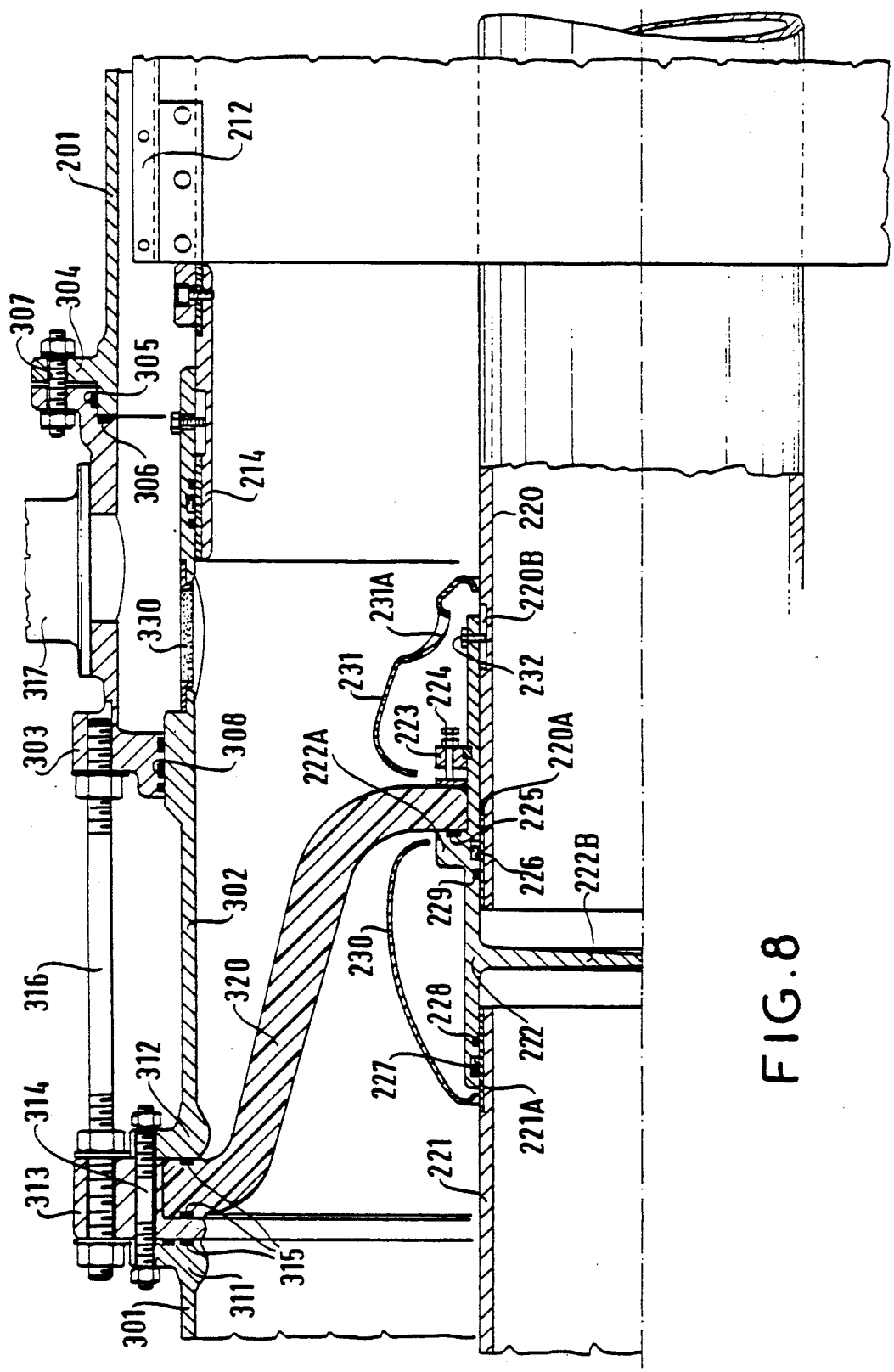
FIG. 8 is an axial half-section view through a link member for interconnecting two lengths of a phase conductor.

FIG. 8 is an axial half-section view through a link element for interconnecting two lengths.

Reference 201 designates the gas-tight sheath of the righthand length in the figure while reference 212 designates its aluminum sheath. Reference 220 designates the phase conductor situated in the righthand length in the figure, while reference 221 relates to the phase conductor in the lefthand length in FIG. 8.

The link member shown in part on the left of FIG. 8 is perfectly symmetrical about a plane perpendicular to the axis of the line length, except insofar as it includes only one insulating cone like that described below.

By virtue of its symmetry, the same link member serves in identical manner to connect a length at the right of FIG. 8 and a length to the left of FIG. 8 represented solely by its phase conductor 221.

The link member comprises a first tube 303 extended by a second tube 302, and in alignment with a third tube 301.

The description begins by describing how the gas-tight tube 201 of the conductor is connected to the link member so as to maintain gas tightness. A metal abutment 304 is welded to the end of the tube 201 and makes end-to-end contact with a shoulder on the tube 303. O-rings 305 and 306 provide sealing between the tubes 201 and 303. Lugs on the abutment 304 and on the tube 303 receive clamping bolts 307. Sealing between the tube 303 and the tube 302 is provided by O-rings 308. Respective annular parts 311 and 312 are fixed to the ends of each of the tubes 301 and 302. These parts engage in sealed manner with a fixing ring 313 which is provided with a shoulder onto which an insulating cone 320 is fixed, with the function of the cone being described below. Bolts 314 fasten the tubes 301 and 302 together, while simultaneously clamping the ring 313 and the cone 320. O-rings 315 provide sealing between the portions situated respectively to the left and to the right of the insulating cone. The ring 313 also serves to pass threaded rods 316 for fixing the tube 303.

The tube 303 bears a service module 317 (not shown in detail) which includes, in particular, a member for filling the sheath with the insulating gas, and a pressure gauge.

It has thus been shown how co-operation between the tubes 201 and 302, and also with the cone 320 serves firstly to guarantee that the outer sheath of the phase conductor is gastight, and secondly to provide sealing between two consecutive lengths of conductor relative to one another. Thus, removing one of the lengths does not give rise to gas loss from the entire line, but only from one length. This purpose can be achieved using only one insulating cone per link member. Since the insulating cones are expensive it is therefore preferable to use only one of them per link member.

The way in which electrical continuity of the aluminum sheaths 212 is achieved is now described. These sheaths are not gas-tight, being merely dust-proof. It is necessary to interconnect them electrically with care since they provide the electrical return conductor.

Figure 9:
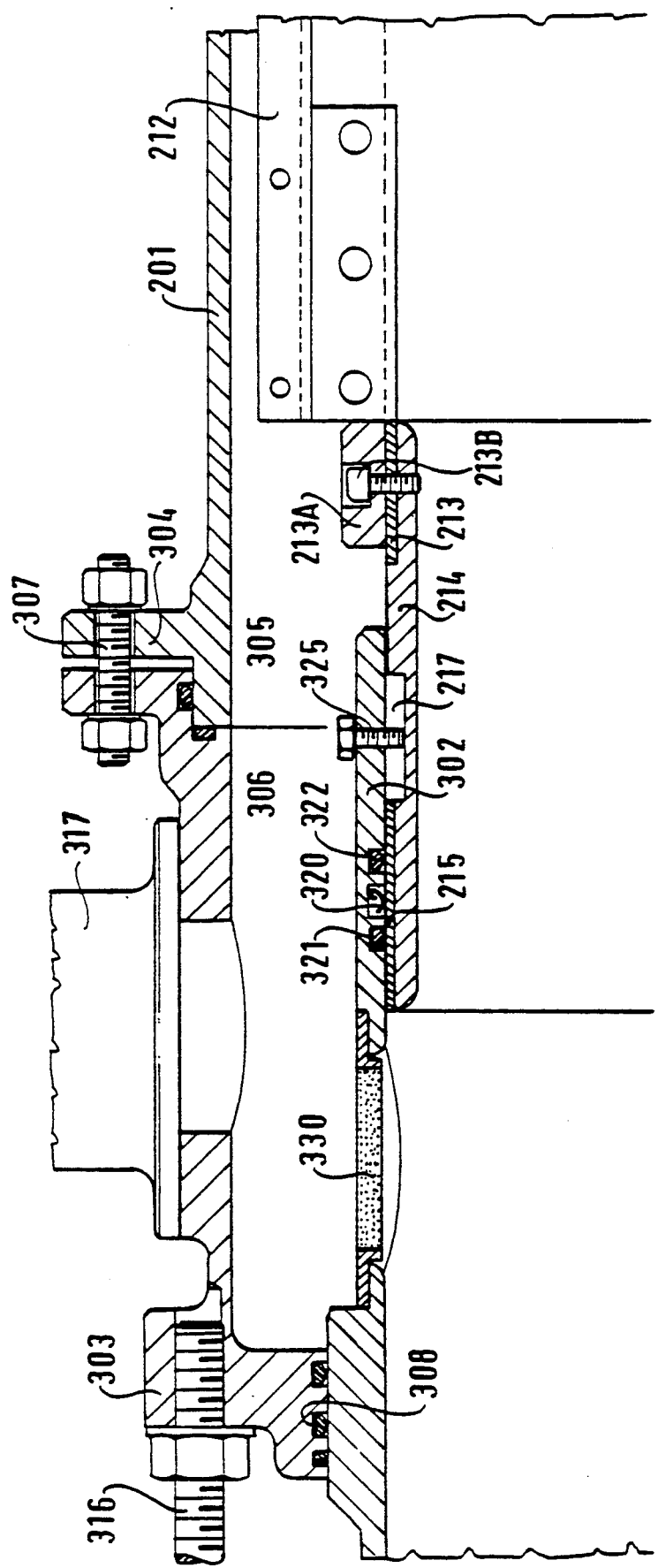
FIG. 9 is an enlarged view of a portion of FIG. 8.
Figure 10:
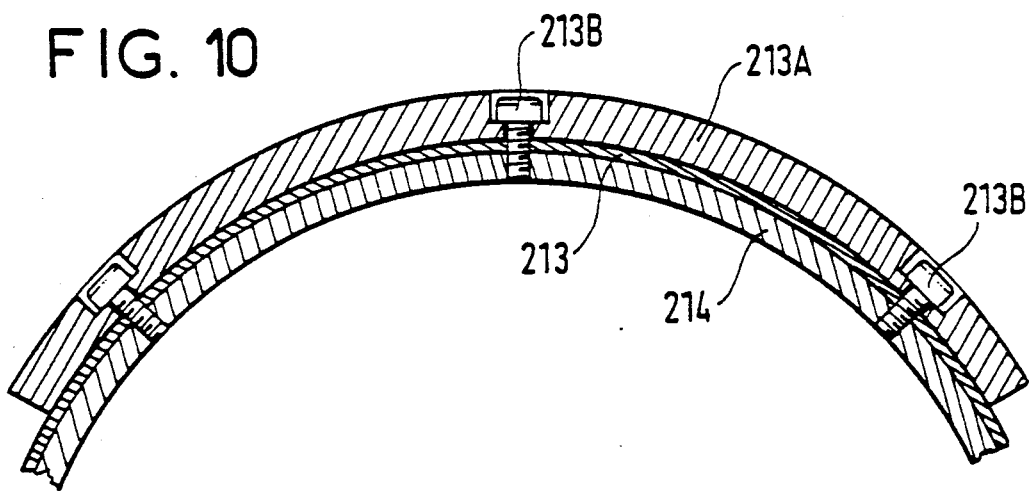
FIG. 10 is a section view through the backing plate that appears in FIG. 9.

In order to fix the aluminum sheath to the link member in the manner described below, the aluminum sheath is subjected to the following preparation:

it is partially cut out in a plane perpendicular to its axis so as to leave a projecting piece 213 (FIG. 9). A portion of thick metal tube 214 is fixed (FIG. 10) to this projecting piece by means of backing plates 213A and screws 213B, said thick metal tube being longer than the piece 213. This portion of tube is partially covered by a bimetallic strip 215 (aluminum below, copper on top). Finally, this portion of tube has grooves 217 (or in a variant oblong holes).

The tube 302 co-operates with the strip 215 to provide electrical continuity for the sheath 201.

To this end, the tube 302 carries a sliding electrical contact 320 surrounded by two anti-dust gaskets 321 and 322. Electrical contact is made between contact 320 and the copper portion of the bimetallic strip 215. The length of the bimetallic strip is selected to be sufficient to ensure that contact is made regardless of the amplitude of relative displacement between the tube 302 and the strip 215, which displacement is due to differential expansion between the lengths.

A screw 325 penetrating into the groove 217 limits the relative excursion possible between the items mentioned.

Returning to FIG. 8, it can be seen that the tube 302 is pierced by a hole that receives a removable dust filter 330. When the tube 303 is disassembled and the filter 330 is removed, an operator has access to the link parts of the conductor 220 which are now described.

Two consecutive conductor portions 220 and 221 are electrically interconnected by a cylindrical sleeve 222 which is stiffened by a central disk 222B.

The conductors 220 and 221 are disposed in axial alignment at a certain distance apart in order to leave room for expansion effects.

The ends of the conductors 220 and 221 are provided with respective contact strips 220A and 221A, which are preferably bimetallic strips.

The sleeve 222 includes a shoulder 222A for sealed fixing by means of a collar 223, bolts 224, and O-rings 225.

The sleeve has sliding electrical contacts 226 and 227 which co-operate respectively with the surfaces 220A and 221A in order to pass electricity between the two conductors 220 and 221.

Anti-dust gaskets 228 and 229, and corona protection caps 230 and 231 complete the device.

The tube 220 includes a groove 220B (or an oblong hole) in which the end of a screw 232 carried by the sleeve 222 is engaged. This disposition serves to limit relative displacement between the sleeve 222 and the conductor 220 due to differential expansion.

It may be observed that the cap 231 carries an opening 231A level with the screw 232 in order to provide access thereto during an assembly or a disassembly operation.

In order to avoid letting dust enter the sheath 212 via the hole that results from the sheath being partially cut-out, this hole may be closed by appropriately folding over the cut portions of the sheath.

The link member makes it possible to assemble and disassemble the line quickly.

For example, disassembly is performed as follows, starting from the assembled position shown in FIG. 8.

In this example, it is assumed that the length 201, 212, and 220 is to be replaced: the screws 307 and the threaded rods 316 are unscrewed and the tube 303 is caused to slide to the left in the FIGURE. This gives access to the filter 330 which can be removed. Access is now available to the screw 232 via the orifice 231A, and this screw is removed. The same operations are performed on the other end of the link member which can then be displaced, thereby disengaging one end of the length of line under consideration. To release the length, all that remains to be done is to disassemble one side only of the other link member of the length under consideration.

The line is assembled by performing these same operations in the opposite order.

Figure 11:
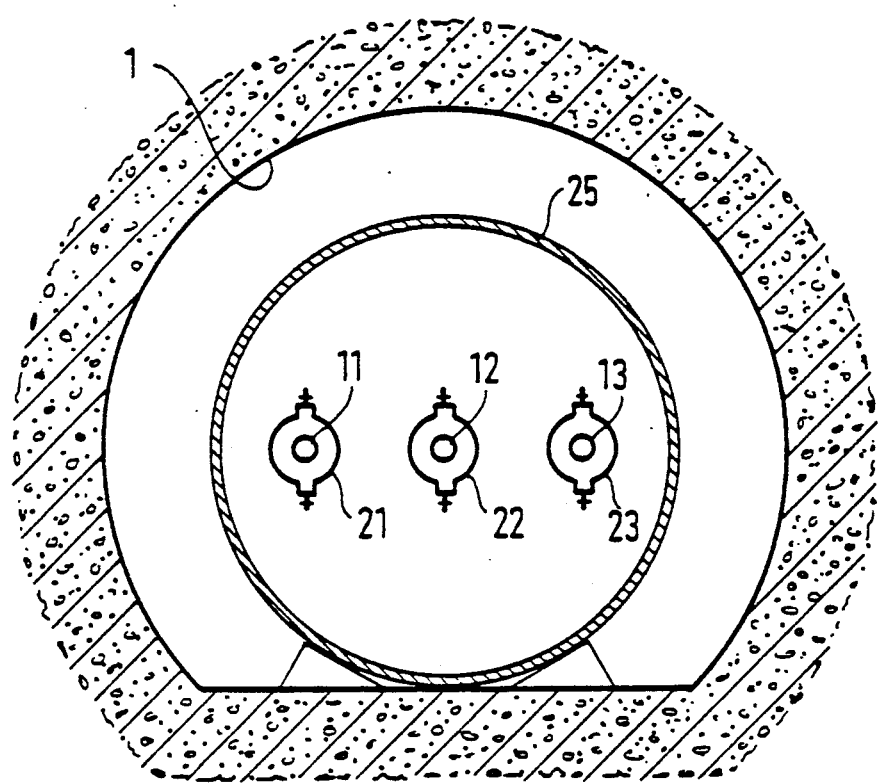
FIG. 11 is a diagrammatic cross-section view through a line having three phase conductors each having an aluminum sheath but sharing a common gas-tight sheath.

In the example described with reference to FIGS. 1 to 10, each phase conductor is provided with its own aluminum sheath and each aluminum sheath is provided with its gas-tight sheath. The invention is applicable mutatis mutandis to a metal-clad line of the type shown in FIG. 11 in which each phase conductor (11, 12, 13) is surrounded by its own aluminum sheath (21, 22, 23), but in which the aluminum sheaths are together surrounded by a common gas-tight sheath (25).

The invention is applicable to constructing high tension metal-clad lines placed in galleries or buried.

I claim:

1. A method of manufacturing a multi-phase metal-clad line comprising, for each phase of said multi-phase line, a phase conductor surrounded by an aluminum sheath, said aluminum sheaths being surrounded by at least one outer sheath which is gas-tight relative to the outside, the gas-tight outer sheath and the aluminum sheaths being filled with a gas having good dielectric properties and under pressure, wherein the method comprises the following steps:

preparing gas-tight tubes of a length lying in the range 5 meters to 20 meters for making lengths of said gas-tight sheath of length L by forming two thin strips of aluminum into two respective half-shells and assembling together progressively said two half-shells as they are being made, thereby constituting said aluminum sheath, providing said strips with stiffening members (116), holding members (120, 130) for holding the phase conductor, and running means (114);

disposing the phase conductor inside the aluminum sheath progressively while the phase conductor being fixed to said aluminum sheath by said holding member;

during the assembly of the aluminum sheath and the conductor pulling progressively the assembly into a corresponding length of gas-tight outer sheath until the opposite end of the length of gas-tight outer sheath is reached;

disposing at least one of such assembly inside a gas-tight outer sheath;

repeating the above steps to make another length of metal-clad multi-phase line following the length having just been completed;

interconnecting two following lengths of gas-tight outer sheath, the aluminum sheaths and conductors by link means;

repeating all of the above steps until each of the phases of the line has the desired length; and filling the multi-phase line with the selected dielectric gas at the desired pressure, length by length.

2. A multi-phase metal-clad line comprising, for each phase, a phase conductor surrounded by an aluminum sheath, an outer sheath which is gas-tight relative to the outside surrounding each aluminum sheath, the insides of said gas-tight sheaths being filled with a gas having good dielectric properties, each said aluminum sheath being made from two half-shells, each half-shell being formed from a folded strip having a section in the form of a semicircle terminated at each end by a shoulder and by a flat, said two half-shells being juxtaposed and means assembling the flats of said two half-shells together.

3. A metal-clad line according to claim 2, wherein the aluminum sheaths are disposed so that a plane interconnecting the flats is vertical.

4. A metal-clad line according to claim 2, wherein the aluminum sheaths are further provided with stiffeners constituted by assembled pairs of half-collars external of said two half-shells.

5. A metal-clad line according to claim 2, wherein the aluminum sheaths are supported inside the gas-tight sheath via wheels.

6. A metal-clad line according to claim 2, wherein the phase conductor is held inside each aluminum sheath by fixing members constituted by insulating cone portions provided with a leg fixed to the aluminum sheath and an arm bearing a collar through which the conductor is threaded.

7. A metal-clad line according to claim 6, wherein each leg is fixed to the top portion of the sheath.

8. A metal-clad line according to claim 2, wherein the phase conductor is held inside the aluminum sheath by means of insulators fixed to the aluminum sheath.

9. A metal-clad line according to claim 8, wherein the insulators are suspended from the top portion of the aluminum sheath.

10. A metal-clad line according to claim 2, wherein the gas-tight sheath is made of a material selected from the group consisting of: steel, concrete, and plastics.

11. A metal-clad line according to claim 2, wherein the line comprising, a plurality of lengths joined by a link member having at each of the ends, thereof a first tube which is laterally displaceable and provided with an end O-ring co-operating with an abutment fixed to the end of said gas-tight outer tube, thereby sealing the gas-tight outer tube.

12. A metal-clad line according to claim 11, wherein said link member includes a second tube coaxial with said third tube and in gas-tight contact therewith.

13. A metal-clad line according to claim 12, wherein said first tube is held in place by threaded rods engaged in an annular part clamped between said second tube and a third tube which is in alignment with said second tube.

14. A metal-clad line according to claim 13, wherein said link member comprises an insulating cone fixed to said second and third tubes and holding the phase conductor length by means of a sleeve overlapping respective ends of said conductor lengths.

15. A metal-clad line according to claim 14, wherein said second tube is in electrical contact with a portion of a metal tube connected to the aluminum sheath.

16. A metal-clad line according to claim 15, wherein said portion of said metal tube is covered by a bimetallic strip which operatively engages sliding contacts carried by said second tube.

17. A metal-clad line according to claim 15, wherein the link member comprises means for limiting relative displacement of the second tube and of said portion of said metal tube.

18. A metal-clad line according to claim 17, wherein said means for limiting said displacement comprise a screw carried by said second tube and co-operating with a groove or oblong hole in said portion of said metal tube.

19. A metal-clad line according to claim 14, wherein said sleeve is made of metal and carries sliding contacts that engage respective ends of two end-to-end phase conductors.

20. A metal-clad line according to claim 19, wherein the link member includes means for limiting relative displacement of the sleeve and a conductor.

21. A metal-clad line according to claim 20, wherein said means for limiting said displacement comprises a screw carried by the sleeve and engaged in a groove or an oblong hole in the conductor.

22. A metal-clad line according to claim 11, wherein said first tube carries a service module comprising at least a pressure gauge and an orifice for dielectric gas filling.

23. A metal-clad line according to claim 12, wherein said second tube includes a removable dust filter.

24. A metal-clad line according to claim 23, wherein said dust filter is disposed over said screw carried by said sleeve.

25. A metal-clad line according to claim 15, wherein an opening between the aluminum sheath and the portion of the metal tube which is fixed thereto is closed by folded portions of the sheaths.

26. A multi-phase metal-clad line comprising, for each phase, a phase conductor surrounded by an aluminum sheath, an outer sheath which is gas-tight relative to the outside commonly surrounding the aluminum sheaths for the phase conductors of the multi-phase metal-clad line, the inside of said gas-tight sheath being filled with a gas having good dielectric properties, each said aluminum sheath being made from two-half shells, each half-shell being formed from a folded strip having a section in the form of a semicircle terminated at each end by a shoulder and by a flat, said two half-shells being juxtaposed and means assembling the flats of the two half-shells together.

27. A metal-clad line according to claim 26, wherein the aluminum sheaths are disposed so that a plane interconnecting the flats is vertical.

28. A metal-clad line according to claim 26, wherein the aluminum sheaths are further provided with stiffeners constituted by assembled pairs of half-collars external of said two half-shells.

29. A metal-clad line according to claim 26, wherein the aluminum sheaths are supported inside the gas-tight sheath via wheels.

30. A metal-clad line according to claim 26, wherein the phase conductor in each aluminum sheath is held inside by fixing members constituted by insulating cone portions provided with a leg fixed to each aluminum sheath and an arm bearing a collar through which the conductor is threaded.

31. A metal-clad line according to claim 26, wherein the phase conductor in each aluminum sheath is held inside by means of fixing members constituted by insulating cone portions provided with respective legs fixed to each aluminum sheath and arms fixed to a collar through which the conductor is threaded.

32. A metal-clad line according to claim 26, wherein each leg is fixed to the top portion of each aluminum sheath.

33. A metal-clad line according to claim 26, wherein the phase conductor in each aluminum sheath is held inside by means of insulators fixed to each aluminum sheath.

34. A metal-clad line according to claim 26, wherein the insulators are suspended from the top portion of each aluminum sheath.

35. A metal-clad line according to claim 26, wherein the gas-tight sheath is made of a material selected from the group consisting of steel, concrete, and plastics.

* * * * *